Feb. 27, 1923.
A. B. SEVERN.
ROLLER SIDE BEARING.
FILED JAN. 19, 1922.
1,446,859.
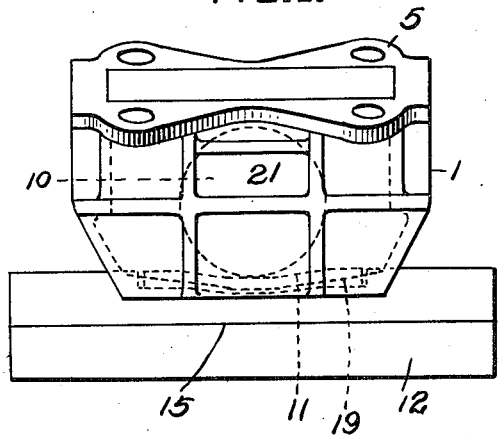
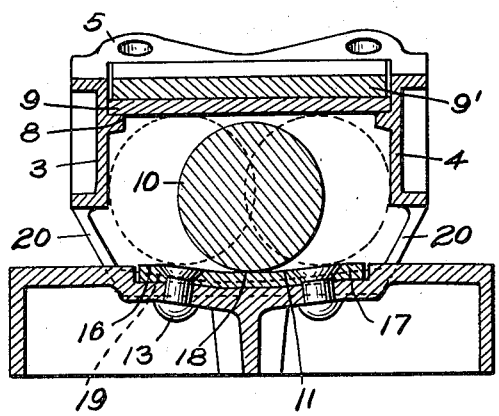
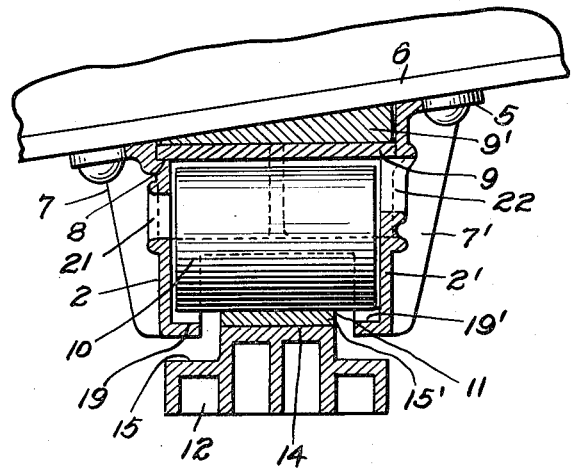
WITNESSES
J. Herbert Bradley.
INVENTOR
Arthur B. Severn
By Winter & Brown
His attys.

Patented Feb. 27, 1923.

1,446,859

UNITED STATES PATENT OFFICE.

ARTHUR B. SEVERN, OF PITTSBURGH, PENNSYLVANIA, ASSIGNOR TO A. STUCKI COMPANY, OF PITTSBURGH, PENNSYLVANIA, A CORPORATION OF PENNSYLVANIA.

ROLLER SIDE BEARING.

Application filed January 19, 1922. Serial No. 530,346.

*To all whom it may concern:*

Be it known that I, ARTHUR B. SEVERN, a citizen of the United States, and a resident of Pittsburgh, in the county of Allegheny and State of Pennsylvania, have invented a new and useful Improvement in Roller Side Bearings, of which the following is a specification.

This invention relates to anti-friction side bearings for railway cars, and has for its objects the provision of a bearing of this type in which the roller is self-centering, in which the liability of the roller developing flat spots or recesses on its circumference, or the track upon which the roller runs becoming rough or recessed, thus interfering with the free travel of the rolling element, is prevented, and in which the roller gravitates to the center of its track under its own weight immediately after contact between the cage and roller is broken, that is, as soon as the body of the car lifts sufficiently to break contact with the roller.

Other objects of the invention are to provide a removable wear plate for the cage which is held in place by the positioning of the cage, and to provide a side bearing which obviates the necessity of using any special devices for moving the roller, either into operative or inoperative positions.

A special object of the invention is to provide a roller side bearing in which the roller will be retained within its cage regardless of the degree of vertical clearance between the parts, and in which the roller though freely mounted will not be lost under abnormal clearances between the truck and body bolsters, or even if the truck bolster be entirely broken away in case of a wreck.

It is also a special object to provide means whereby the roller will be self-centering, regardless of the degree of clearance whereby the bearing will function more effectively, and it is still a further object to provide bearing surfaces which will be so associated with the remaining parts as to obviate the necessity of providing special means to keep them free of foreign matter. Another object of the invention is to provide a device which will function as a plain bearing in case the roller should become broken.

These and other objects will more readily appear when taken in connection with the following description and the appended claims.

In the accompanying drawings Fig. 1 is a side elevation of the preferred embodiment of the invention; Fig. 2 a longitudinal sectional view through the same; and Fig. 3 a transverse sectional view with parts in elevation taken at right angles to that of Fig. 2.

The embodiment of the invention shown comprises a cage having the depending side walls 2, 2', end walls 3 and 4, and is provided with perforated ears or lugs 5 for attaching the same to the body bolster 6 as by bolting indicated at 7, and is also provided with the strengthening ribs 7'.

A shoulder or ledge 8 is formed on the side and end walls which is attached to support and retain the upper bearing plate 9 and its backing plate 9' in close contact with the bolster 6.

The dimensions of both the cage and backing plate gradually increase from one side to the other, as clearly shown in Fig. 3, so as to accommodate the parts to the inclination of the body bolster, and at the same time present a substantially horizontal bearing surface to the cylindrical roller 10 which rides upon a lower bearing plate or track 11, mounted on the truck bolster 12, and attached thereto as by riveting indicated at 13.

The truck bolster is provided with two separate bearing surfaces disposed in different horizontal planes, the higher one being formed by a raised intermediate portion 14, on which the bearing plate 11 is supported, and the lower marginal bearing surfaces indicated at 15 and 15'. The opposite ends 16 and 17 of the lower bearing plate 11 are flat for a short distance whence they slope downwardly towards and merge into a central flat portion 18, so as to render the roller self-centering.

The length of roller 10 is slightly less than the distance between the side walls 2 and 2', and is absolutely free, being normally supported by merely resting upon the track 11 and is perfectly free to gravitate under its own weight towards the flat central portion 18 whenever the upper bearing plate 9 is out of contact therewith.

The lower edges of the depending walls 2, 2' are provided with inturned flanged portions 19, 19', which normally lie below the bearing surface of the track 11, and are disposed in alignment with the bearing surfaces 15, 15', the intermediate raised portion 14 with the attached plate 11 extending upwardly between the flanges. Both the top and bottom faces of flanges 19, 19' are adapted to function as auxiliary bearing surfaces, the top faces being inclined downwardly towards their central portion in a manner similar to the bearing plate 11, while their bottom faces are straight so as to cooperate with the straight bearing surfaces 15, 15'.

The walls 2, 2' prevent lateral movement of the roller, the walls 3 and 4 limit its rolling movement along the bearing plates 9 and 11, and the flanges 19, 19' prevent its escaping from the cage.

The flanges 19, 19' on the depending walls 2, 2' of the cage are in alignment with the faces of the marginal bearings 15, 15' so that the bottom faces of the flanges abut and cooperate with the surfaces 15, 15' to function as a plain bearing in case of breakage of the roller 10.

In the embodiment illustrated the surfaces 15, 15' are shown as a part of the truck bolster and flanges 19, 19' as formed integrally with the cage, but it is to be understood, however, that such portions may be in the form of separate and independent members, if desired.

Each of the bearing plates is formed independently so that the same may be made of material possessing high wear-resisting qualities without adding greatly to the cost of manufacture, and each is removably mounted to facilitate replacement if desired or necessary.

The cage is provided with openings 20 in its end walls which cooperate with its open bottom so as to permit relative movement between the parts mounted upon the truck and body bolsters, and which also prevents foreign matter from accumulating within the cage. Openings 21 and 22 are also provided in the side walls, the top of the opening 22 being flush with the bearing plate 9 for observation purposes.

In the construction illustrated, no special provision is required to rid the lower bearing surface of foreign materials due to the raised central portion 14 and the unobstructed sides of margins 15, 15', all foreign substances escaping therefrom under the influence of gravity.

The operation of the device is as follows: The upper and lower bearing plates are normally at such a distance from each other that the flanges 19, 19' lie below the bearing surface of plate 11 and roller 10 rests upon the flat portion 18. Whenever the car body sways downwardly a sufficient distance the upper bearing plate 9 is brought into contact with the roller 10 and any swivelling movement of the truck will cause the roller to ride up on the inclined end portions of the bearing plate 11. As soon as the body lifts, contact between the bearing plate 9 is broken, permitting the roller to gravitate under its own weight back to the flat central portion 18. The return of the roller occurs immediately upon the lifting of the body and without the use of any auxiliary mechanism or parts. This quick turn without the use of lost motion devices is found to be of great practical importance, and in applicant's device is secured by a very simple construction.

Should the car body sway upwardly sufficiently far the flanges 19, 19' will be brought into contact with roller 10 and lift the same from the bearing plate 11, regardless of its position thereon. As soon as contact between the roller 10 and plate 11 is broken, due to the inclination of the flanges towards their central portions, the roller will gravitate thereto, rolling downwardly upon the top bearing surfaces of the flanges so as to be properly centered whenever normal clearance between the body and truck is restored. Should the roller become broken and the car body approach the truck, the flanges 19, 19' and surfaces 15, 15' will cooperate and function as a plain bearing as above described.

Due to the fact that the flat central portions are of appreciable length, the roller 10 will not always come to rest at the same point, but at various points throughout their length, and will rest upon various parts of its periphery, thus assuring substantially uniform wear of both the bearing surfaces and the roller. Besides, the roller itself when thrown against the end walls by severe end shocks, will rotate somewhat to present new lines of contact.

Under ordinary conditions of operation the roller 10 merely traverses the extent of the inclined and central flat portions of the bearing plate 11. The parts are so designed that at the time one of the end walls 3 or 4 abuts the roller, it will have travelled the full extent of the inclined portion. Consequently, after the roller reaches this extreme rolling limit, further relative movement between the upper and lower bearing parts will cause the roller to be slid bodily upon the flat extremities 16 and 17 functioning in the manner of a plain bearing.

Although the invention has been illustrated and described with the cage attached to the body, it is obvious that the flanges 19, 19' upon the cage would effectively confine the roller and prevent its escape therefrom, should the mounting of the parts be reversed, in which instance the bearing upon which the roller normally rests will be inclined from its opposite ends towards a flat central portion to center the same.

The bearing described is of simple construction, is inexpensive to manufacture, easy to repair, is very durable, is quickly responsive and self-centering, contains a minimum number of parts, is constructed to prevent accumulation of dirt and foreign substances upon the bearing surfaces, precludes the escape of the roller upon abnormal clearances between the parts, and effectively functions as a plain bearing in case the roller should become broken.

I claim:

1. A side bearing for railway cars comprising upper and lower bearing plates, a free roller interposed therebetween, a cage associated with one of said plates for retaining the roller in position, the cage being provided with lateral flanges partially embracing the roller to prevent escape thereof during abnormal clearance between the bearing plates, said flanges being inclined towards their central portion to render the roller self-centering thereon.

2. A side bearing for railway cars comprising a lower bearing plate, an upper bearing plate, a free roller interposed therebetween, a cage supporting the latter plate and embracing the roller, the cage being so formed that a portion thereof normally extends below the bearing surface of the lower plate, but is adapted to contact the roller to prevent escape of the roller during abnormal clearance between said plates, the lower plate being inclined downwardly towards its central part.

3. A side bearing for railway cars comprising a lower bearing plate, an independent removable upper bearing plate, a free self-centering roller interposed therebetween, a cage supporting the upper plate for confining the roller in position, the cage being so formed that a portion thereof normally extends below the bearing surface of said lower plate but is adapted to contact the roller to prevent escape thereof during abnormal clearance between said plates.

4. A side bearing for railway cars comprising a lower bearing plate, an independent removable upper bearing plate, a free self-centering roller interposed therebetween, a cage supporting the upper plate for confining the roller in position, the sides of the cage being formed with inwardly directed flanges normally disposed below the bearing surface of the lower plate and out of contact with the roller but adapted to contact said roller and prevent escape thereof during abnormal clearance between the plates.

5. A side bearing for railway cars comprising a lower bearing plate, an independent removable upper bearing plate, a free self-centering roller interposed therebetween, a cage supporting the upper plate for confining the roller in position, the sides of the cage being formed with inwardly directed flanges normally disposed below the bearing surface of the lower plate and out of contact with the roller but adapted to contact said roller and prevent escape thereof during abnormal clearance between the plates, said flanges being inclined downwardly towards their central portions to center the roller.

6. A side bearing for railway cars comprising a lower bearing plate, an independent removable upper bearing plate, a free self-centering roller interposed therebetween, a cage supporting the upper plate for confining the roller in position, the sides of the cage being formed with inwardly directed flanges normally disposed below the bearing surface of the lower plate and out of contact with the roller but adapted to contact said roller and prevent escape thereof during abnormal clearance between the plates, both the lower bearing plate and said flanges being inclined downwardly towards their central portions to center the roller.

7. A side bearing for railway cars comprising an upper bearing plate, a lower bearing having two sets of bearing surfaces disposed in different horizontal planes, a free self-centering roller interposed between said plate and the higher of said bearing surfaces, a cage embracing the roller the depending sides of which are provided with inturned flanges disposed beneath the roller and normally positioned below said higher surface so as to be out of contact with the roller during normal clearances, but adapted to contact and lift the same during abnormal clearances, both the said higher surface and the upper surface of the inturned flanges being inclined towards their central portions, and the lower surface of the inturned flanges being disposed opposite the lower of said horizontal surfaces.

8. A side bearing for railway cars comprising upper and lower bearing plates, a free roller interposed therebetween, a cage associated with one of said plates for retaining the roller in position, the other of said plates having outer extremities and a central portion all of which are flat, said outer flat extremities being adapted to function as plain bearings after the roller contacts the end of the cage, and inclined portions connecting each of the said extremities with said central portion.

In testimony whereof, I sign my name.

ARTHUR B. SEVERN.

Witness:
EDWIN O. JOHNS.